United States Patent
Kumagai

(10) Patent No.: US 8,634,205 B2
(45) Date of Patent: Jan. 21, 2014

(54) CASE MOUNTING STRUCTURE, CASE, AND CASE MOUNTING METHOD

(75) Inventor: Keiichirou Kumagai, Tokyo (JP)

(73) Assignee: NEC Corporation, Tokyo (JP)

(*) Notice: Subject to any disclaimer, the term of this patent is extended or adjusted under 35 U.S.C. 154(b) by 520 days.

(21) Appl. No.: 12/935,029

(22) PCT Filed: Apr. 7, 2009

(86) PCT No.: PCT/JP2009/057421
§ 371 (c)(1),
(2), (4) Date: Sep. 28, 2010

(87) PCT Pub. No.: WO2009/125864
PCT Pub. Date: Oct. 15, 2009

(65) Prior Publication Data
US 2011/0017754 A1    Jan. 27, 2011

(30) Foreign Application Priority Data
Apr. 9, 2008  (JP) ................. 2008-100909

(51) Int. Cl.
  *H05K 7/14* (2006.01)
  *H05K 7/18* (2006.01)
(52) U.S. Cl.
  USPC ......................................... 361/801; 361/802
(58) Field of Classification Search
  USPC ............ 361/755, 801–803; 455/575.1–575.3, 455/575.26
  See application file for complete search history.

(56) References Cited

U.S. PATENT DOCUMENTS

| | | | |
|---|---|---|---|
| 7,414,855 B1* | 8/2008 | Arnold | 361/752 |
| 7,907,415 B2* | 3/2011 | Ueyama | 361/749 |
| 7,925,316 B2* | 4/2011 | Hongo et al. | 455/575.3 |
| 8,108,015 B2* | 1/2012 | Sakashita et al. | 455/575.3 |
| 8,243,459 B2* | 8/2012 | Hoshino | 361/755 |
| 8,331,098 B2* | 12/2012 | Leung | 361/755 |
| 8,427,838 B2* | 4/2013 | Hsieh et al. | 361/759 |
| 2004/0198247 A1 | 10/2004 | Jokinen et al. | |

FOREIGN PATENT DOCUMENTS

| | | |
|---|---|---|
| JP | 8-56082 A | 2/1996 |
| JP | 9-275435 A | 10/1997 |
| JP | 10-40890 A | 2/1998 |
| JP | 2001284830 A | 10/2001 |
| JP | 2004165851 A | 6/2004 |
| JP | 2005-506764 A | 3/2005 |
| JP | 2005506764 A | 3/2005 |
| JP | 2006165046 A | 6/2006 |
| JP | 2007141751 A | 6/2007 |
| JP | 2008011055 A | 1/2008 |

OTHER PUBLICATIONS

European search report for EP09730828.2 dated Aug. 24, 2012.
International Search Report for PCT/JP2009/057421 mailed May 19, 2009.
Japanese Office Action for JP Application No. 2010-507298 mailed on Jun. 25, 2013 with English Translation.

* cited by examiner

*Primary Examiner* — Hung S Bui

(57) ABSTRACT

A case mounting structure, a case, and a case mounting method, do not use a screw to fix the cover and has strong mounting strength against shock which is generated when the case falls. The case mounting structure includes a cover which can be attached to a case, and a lock part which is arranged on the case and locks the cover, where the lock part is deformed so as to prevent a movement for releasing lock when the cover is attached to the case.

8 Claims, 8 Drawing Sheets

CASE MOUNTING STRUCTURE, CASE, AND CASE MOUNTING METHOD

This application is the National Phase of PCT/JP2009/057421, filed Apr. 7, 2009, which is based upon and claims the benefit of priority from Japanese Patent Application No. 2008-100909, filed on Apr. 9, 2008, the disclosure of which are incorporated herein in their entirety by reference.

TECHNICAL FIELD

The present invention relates to case mounting structure, a case and a case mounting method and particularly, relates to case mounting structure, a case and a case mounting method of a portable type electronic device.

BACKGROUND ART

In recent years, a portable type electronic device such as a cellular phone is composed of not only a front case and a rear case, but also another part (cover of case end part) in order to enhance the design property.

At this time, a screw is often used to fix the cover of case end part (hereinafter, "cover" will be used.) for enhancing the shock resisting property. Since using a screw causes to increase number of parts, using a screw is a main factor to enlarge device size and to increase a device cost.

It is still major proposition to enhance the design property of the portable electronic device and simultaneously, to secure the shock resisting property and to realize both of miniaturization and cost reduction of the device.

A portable type electronic device, which is equipped with a cover, related to the present invention includes, at least, a front case, a rear case, a cover and a printed wiring board (for example, refer to patent document 1).

According to the invention disclosed in the patent document 1, the cover covers a part of the front case and the rear case. Moreover, according to the invention, the front case, the rear case and the cover are tightened by a screw so that both of two cases and the cover may be fixed together. For this reason, it is possible to have the strong shock resisting property against shock due to a fall or the like.

Meanwhile, an audio apparatus, which makes a front glass slide on a panel body and makes a convex fitting part and a projection part, which are arranged on the front glass, fitted in a concave fitting part and a dent part which are arranged on the panel body, is disclosed (refer to patent document 2).

Moreover, secondary battery locking structure to lock a secondary battery in a rear cover is disclosed (refer to patent document 3). According to the structure, when the secondary battery is fit in the rear cover, a convex part, which is arranged on the rear cover, is fit in a concave part which is arranged on the secondary battery, and a hook, which is arranged on the rear cover, is pressed by an end part of the secondary battery. Consequently, the hook is rotated to lock the secondary battery in the rear cover.

CITATION LIST

[Patent citation 1] Japanese Patent Application Laid-Open No. 2006-165046
[Patent citation 2] Japanese Patent Application Laid-Open No. 2001-284830
[Patent citation 3] Japanese Patent Application Laid-Open No. 1998-040890

DISCLOSURE OF INVENTION

Technical Problem

However, if at least one fixation by a screw is required like the cover fixing structure disclosed in the patent document 1, a boss and a nut are also required for fixation by the screw at this time. Moreover, mounting space for arranging these parts is required and a part for putting the screw out of sight is also required. Accordingly, number of parts becomes increasing and restriction on the design is also caused. According to the above mention, a problem of enlargement of the portable type electronic device size and a problem of increase of the device cost are caused. Consequently, it is difficult to make the portable type electronic device miniaturized and to reduce cost of the portable type electronic device.

As a fitting method with no use of a screw to fix a cover, the fixed fitting structure, which has strong resisting strength against shock generated at a time of falling or the like, can be considered. In this case, it is not easy to dismantle the device, when repairing the device.

The patent document 2 discloses the audio apparatus which includes a structure for mounting the front glass on the panel body. However, structure for detaching the front glass from the panel body is not disclosed in the patent document 2 at all.

The patent document 3 discloses the secondary battery locking structure which includes the hook to lock the secondary battery. However, the hook is not for fixing the cover.

Then, an object of the present invention is to provide case mounting structure, a case and a case mounting method, which do not require a screw to fix a cover and has strong resisting strength against shock generated at a time when the case falls.

Solution to Problem

In order to solve the above mentioned problem, the case mounting structure according to the present invention includes a cover which can be attached to a case and a lock part which is arranged on the case and locks the cover, wherein the lock part is deformed so as to prevent a movement for releasing lock when the cover is attached to the case.

Moreover, the case according to the present invention has the case mounting structure.

The case mounting method according to the present invention includes joining a first member and a second member of a case, arranging a hook part of a cover, which can be attached to the first member and the second member, in front of pawl parts of the first member and the second member to which the hook of the cover can be attached, locking the cover to a lock part, which is arranged on the first member, by making an end part of the cover slide through pressing the end part of the cover against the lock part, and fitting the hook part of the cover and the pawl parts of the first member and the second member.

Advantageous Effects of Invention

According to the present invention, a screw to fix the cover is not necessary and it is possible to have strong mounting strength against shock generated at a time of falling.

EXPLANATION OF REFERENCE

Figure 1A:
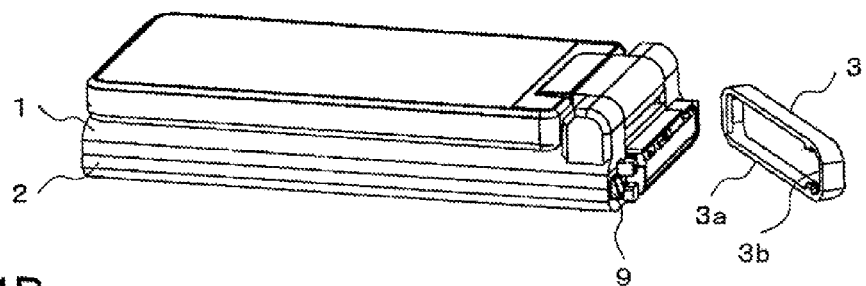
FIG. 1A shows an example of a cover attaching process on the basis of case mounting structure according to an exemplary embodiment.

1 Front case
2 Rear case
3 Cover
3a Side wall
3b End part
4 Hook part
5 Hook part
6 Hook part
7 Pawl part
7a Ditch
8 Pawl part
8a Ditch
9 Lock part
10 Pawl part
10a Ditch
11 Pawl part
11a Ditch
13 Notch part
14 Notch part
15 Taper surface
16 Notch part
17 Notch part

BEST MODE FOR CARRYING OUT THE INVENTION

First, an exemplary embodiment according to the case mounting structure and the case of the present invention will be described in the following.

Figure 1B:
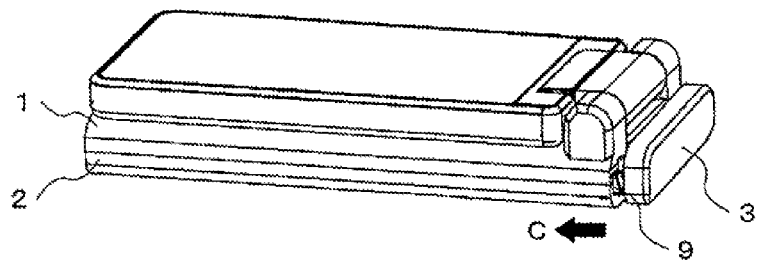
FIG. 1B shows other state in the cover attaching process.
Figure 1C:
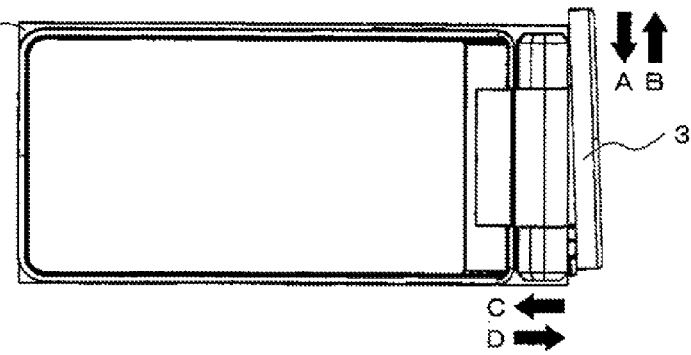
FIG. 1C shows other state in the cover attaching process.
Figure 1D:
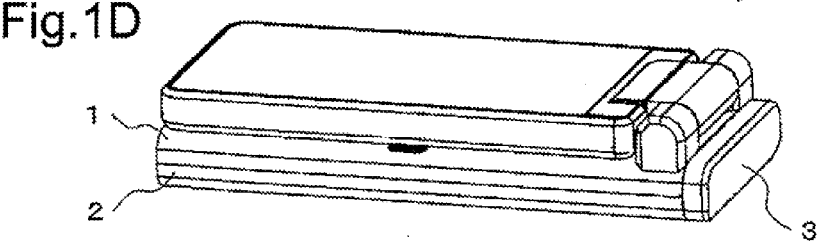
FIG. 1D shows other state in the cover attaching process.

FIG. 1A, FIG. 1B, FIG. 1C and FIG. 1D show an example of a cover attaching process respectively on the basis of the case mounting structure according to the exemplary embodiment. FIG. 1A shows an example of the cover attaching process on the basis of the case mounting structure according to the exemplary embodiment. FIG. 1B, FIG. 1C and FIG. 1D show other state in the cover attaching process respectively.

The case mounting structure and the case according to the exemplary embodiment include a front case 1, a rear case 2, a cover 3 and a lock part 9. Further, the front case 1 and the rear case 2 can be called a case.

The rear case 2 can be joined to the front case 1. The cover 3 can be attached to the front case 1 and the rear case 2. The lock part 9 is arranged on one end part of the front case 1, and is deformed through being pressed by an end part 3b of the cover 3 when the cover 3 is attached to the front case 1. Moreover, in the case that the cover 3 is made slide so that the end part 3b of the cover 3 may pass the lock part 9, the lock part 9 is restored to an original shape. That is, the lock part 9 is deformed so as to prevent a movement for unlocking, and locks the cover 3.

According to the exemplary embodiment, it is possible to attach the cover 3 with no use of a screw. Moreover, according to the exemplary embodiment, since the lock part 9 is covered with the cover 3, the lock part 9 does not shift in a direction indicated by an arrow C (direction for unlocking), even if force is applied from the outside of the cover 3. Accordingly, even if strong shock is applied to the cover 3 when the case falls, there is no case that the cover 3 is unlocked.

As mentioned above, it is not necessary to use a screw in order to fix the cover, and it is possible to have strong mounting strength against shock generated at a time when the case falls, according to the exemplary embodiment.

Next, an exemplary embodiment according to the case mounting method of the present invention will be described.

The exemplary embodiment according to the case mounting method will be described with reference to FIG. 1A, FIG. 1B, FIG. 1C, FIG. 1D, FIG. 3, FIG. 4A, FIG. 4B, FIG. 5A, FIG. 5B and FIG. 7.

Figure 3:
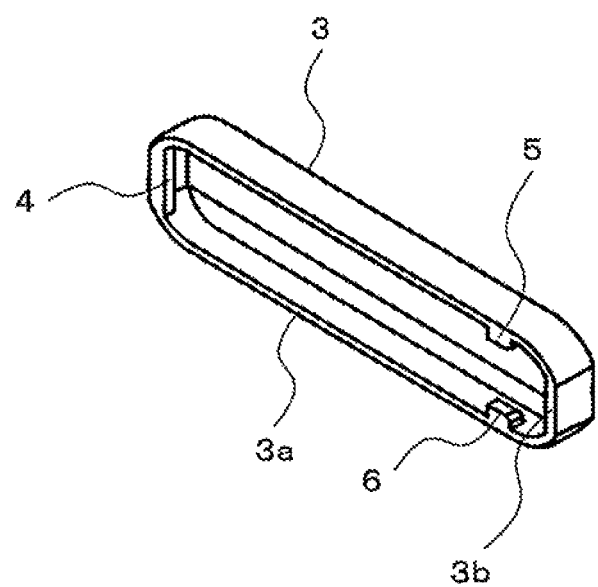
FIG. 3 is a perspective view of an example of a cover.
Figure 4A:
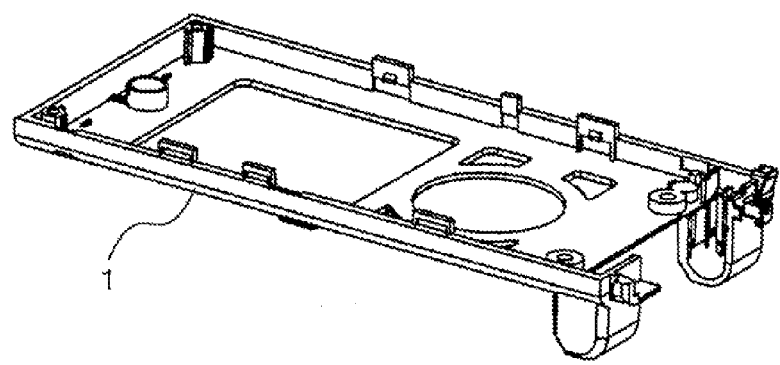
FIG. 4A is a perspective view showing whole structure which is exemplary structure of a front case 1.
Figure 4B:
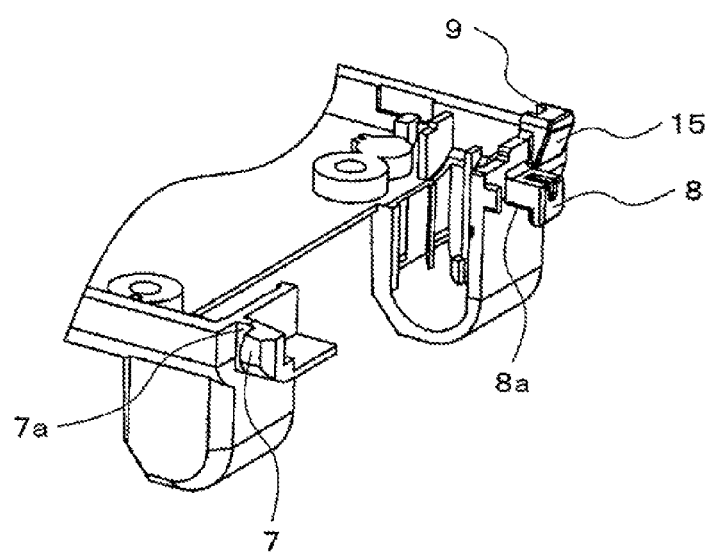
FIG. 4B is an enlarged view of an end part of the front case 1.
Figure 5A:
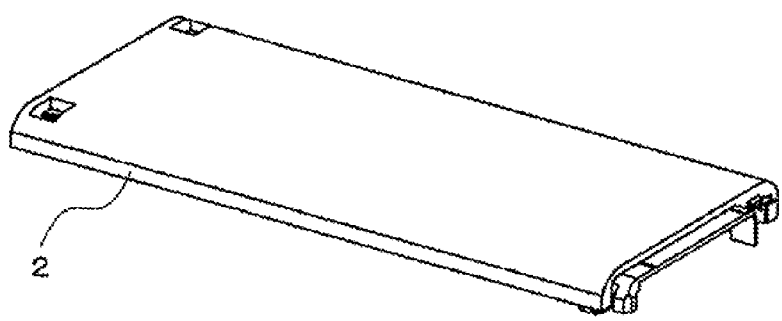
FIG. 5A is a perspective view showing whole structure which is exemplary structure of a rear case 2.
Figure 5B:
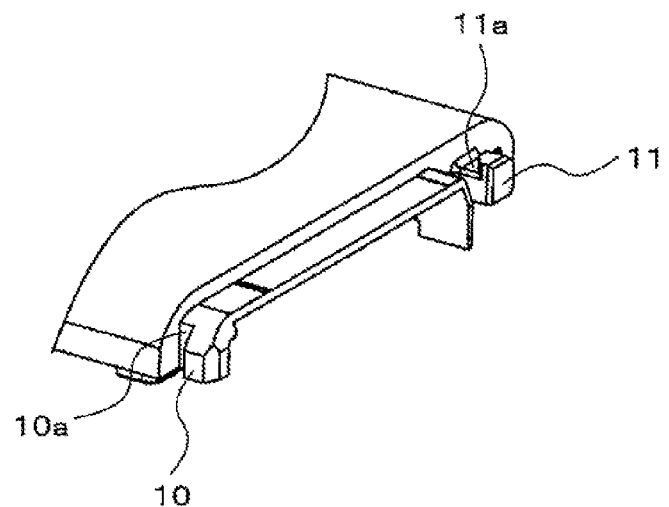
FIG. 5B is an enlarged view of an end part of the rear case 2.
Figure 7:
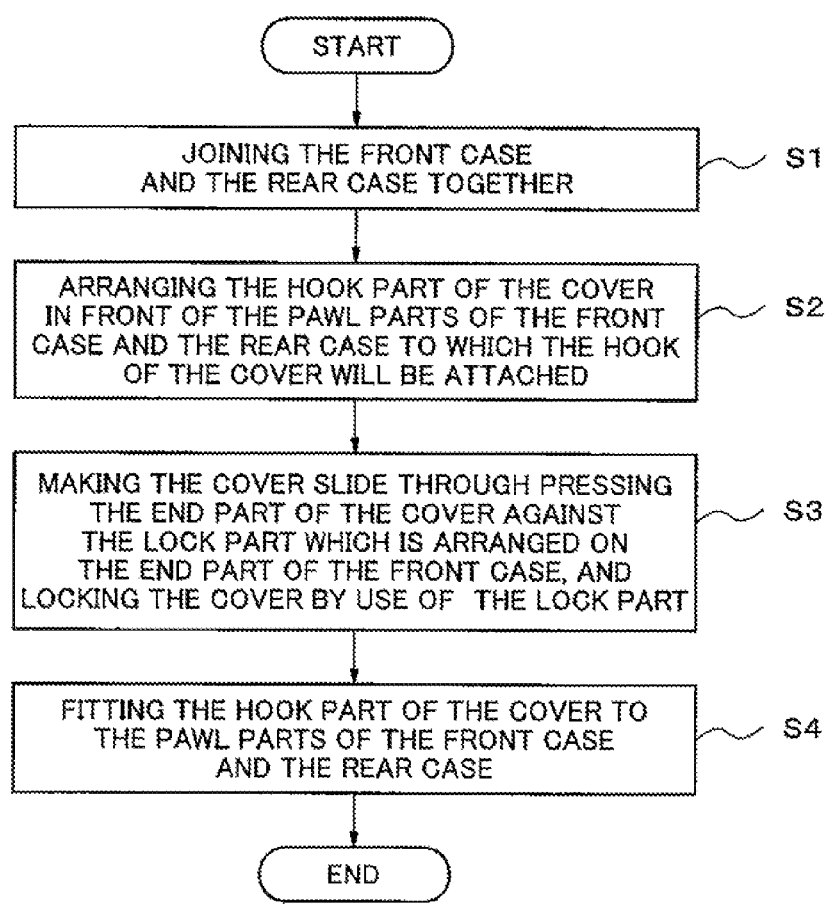
FIG. 7 is a flowchart showing an example of an operation which is carried out in the case that the cover is attached to the front case and the rear case.

FIG. 3 is a perspective view of an example of the cover. FIG. 4A is a perspective view showing whole structure which is exemplary structure of the front case 1. FIG. 4B is an enlarged view of an end part of the front case 1. FIG. 5A is a perspective view showing whole structure which is exemplary structure of the rear case 2. FIG. 5B is an enlarged view of an end part of the rear case 2. FIG. 7 is a flowchart showing an example of an operation which is carried out when the cover is attached to the front case and the rear case.

Firstly, the front case 1 and the rear case 2 are joined together (a case joining step; refer to FIG. 1A and step S1 in FIG. 7).

Next, a hook part 4 of the cover 3 is arranged so as to be in front of a pawl part 7 of the front case 1 and a pawl part 10 of the rear case 2 to which the hook part 4 will be attached. Furthermore, a hook part 5 of the cover 3 is arranged so as to be in front of a pawl part 8 of the front case 1 to which the hook part 5 will be attached. Moreover, a hook part 6 of the cover 3 is arranged so as to be in front of a pawl part 11 of the rear case 2 to which the hook part 6 will be attached (refer to FIG. 1B, FIG. 3, FIG. 4B, FIG. 5B and step S2 in FIG. 7, an arranging step).

At this time, since the lock part 9 is projected and consequently, the lock part 9 disturbs the end part of the cover 3. Therefore, the lock part 9 cannot lock the cover 3.

Then, the end part 3b of the cover 3 is pressed against the lock part 9, which is arranged on one end of the front case 1, in a direction indicated by the arrow C and simultaneously, the cover 3 is made slide in a direction indicated by an arrow A. In the case that the cover 3 is made slide so that the end part 3b of the cover 3 may pass the lock part 9, the lock part 9 comes off from the end part 3b of the cover 3 and returns to an original position by the elastic property. As a result, the lock part 9 locks the cover 3 (a locking step; refer to FIG. 1C and step S3 in FIG. 7).

By the lock, the cover 3 can shift any more neither in a direction indicated by an arrow B nor in the direction indicated by the arrow A. At the same time, the pawl parts 7, 8, 10 and 11 which are arranged on the front case 1 and the rear case 2, and the hook parts 4 to 6 which are arranged on the cover 3 are fit together respectively. Consequently, the cover 3 is fixed (a pawl fitting step; refer to FIG. 1D and step S4 in FIG. 7).

According to the exemplary embodiment, it is possible to fix the cover 3 with no use of a screw. As a result, a part to put a screw out of view is unnecessary and it is possible to enhance the outside appearance. Moreover, since a part to put a screw out of view is unnecessary, it is possible to realize miniaturization and cost reduction. According to the exemplary embodiment, since the lock part 9 is covered with the cover 3. Therefore, the lock part 9 does not shift in the direction indicated by the arrow C (direction for unlocking), even if force is applied from the outside of the cover 3. Accordingly, even if strong shock is applied to the cover 3 when the case falls, the cover 3 does not become unlocked.

As mentioned above, according to the exemplary embodiment, a screw is not necessary for fixing the cover, and it is possible to have the strong mounting strength against shock generated at a time when the case falls. Moreover, it is possible to enhance the assembling property and the outside appearance and to realize miniaturization and cost reduction.

Before describing the exemplary embodiment of the present invention in detail, principle of an operation will be described in the following according to the exemplary embodiment.

Figure 2A:
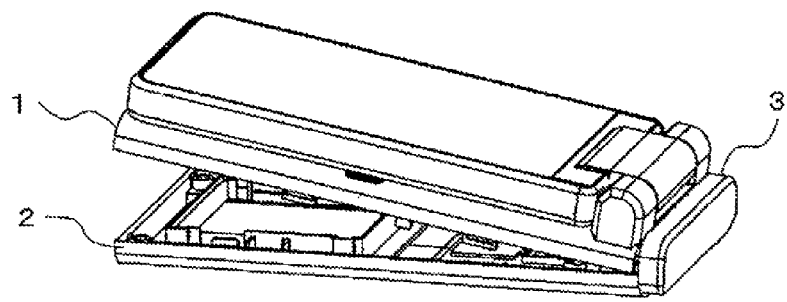
FIG. 2A shows an example of a cover detaching process on the basis of the case mounting structure according to the exemplary embodiment.
Figure 2B:
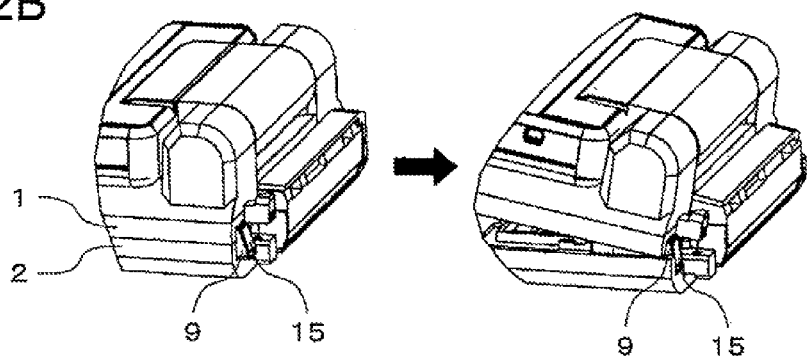
FIG. 2B shows other state in the cover detaching process.
Figure 2C:
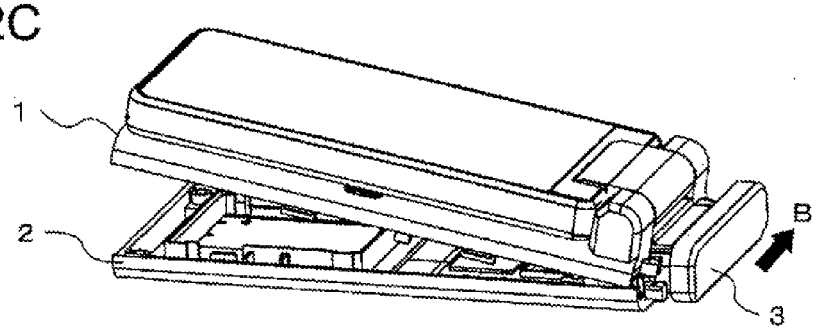
FIG. 2C shows other state in the cover detaching process.
Figure 2D:
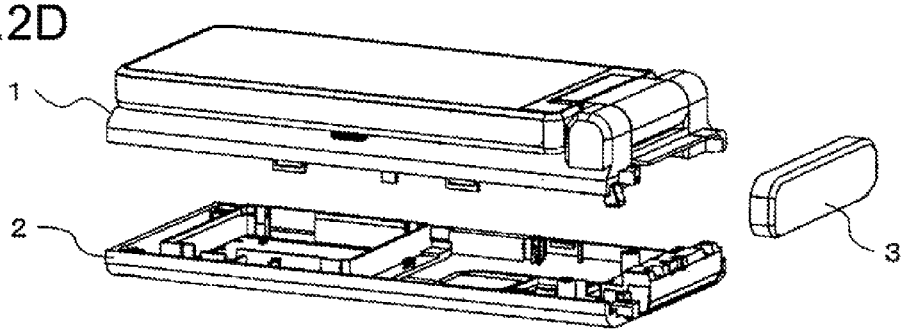
FIG. 2D shows other state in the cover detaching process.

FIG. 1A shows an example of a cover attaching step on the basis of the case mounting structure according to the exemplary embodiment. FIG. 1B, FIG. 1C and FIG. 1D show other state in the cover attaching step respectively. FIG. 2A shows an example of a cover detaching process on the basis of the case mounting structure. FIG. 2B, FIG. 2C and FIG. 2D show other state in the cover detaching process respectively.

First, the cover attaching process will be described.

The exemplary embodiment will be described with reference to FIG. 1A. The case according to the exemplary embodiment includes the front case 1, the rear case 2 which can be joined to the front case 1, and the cover 3 which can be attached to one end part of the front case 1 and one end part of the rear case 2. Further, the front case 1 can be called a first member. Moreover, the rear case 2 can be called a second member.

Furthermore, the case according to the exemplary embodiment includes the lock part 9 which is arranged on one end part of the front case 1. The lock part 9 is deformed through being pressed by the cover 3. Then, the lock part 9 comes off the end part 3b of the cover 3 and returns to the original position by the elastic property in the case that the cover 3 is made slide so that the end part 3b of the cover 3 may pass the lock part 9. As a result, the lock part 9 locks the cover 3. By the lock, the cover 3 is attached to the front case 1. That is, when the cover 3 is attached to the front case 1 and the rear case 2, the lock part 9 is deformed so that a movement for unlocking may be prevented.

That is, the lock part 9, which can be deformed in a direction parallel to a long side of the front case 1 (direction indicated by the arrow C) as shown in FIG. 1B, is arranged on the one end of the front case 1. Moreover, since the lock part 9 has the elastic property, pressing force in the direction indicated by the arrow C disappears when the cover 3 is made slide so that the end part 3b of the cover 3 may pass the lock part 9. Consequently, the lock part 9 returns to the original position (position in a direction indicated by an arrow D). Moreover, the lock part 9 is formed in a taper shape, when viewed from the side.

Meanwhile, the cover 3 is formed to have a lid with a side wall 3a which is arranged around the lid (refer to FIG. 1A). Further, as shown in FIG. 3, a right part of the side wall 3a is described as the end part 3b of the side wall 3a.

In a state that the cover 3 is not attached to one end of either the front case 1 or the rear case 2, the lock part 9 mounted on one end of the front case 1 projects from a face of the end part of the front case 1 (refer to FIG. 1A)).

Accordingly, in the case that the cover 3 is made slide in the A direction (direction vertical to the C direction, refer to FIG. 1C) in order to attach the cover 3 to the end parts of the front case 1 and the rear case 2, the end part 3b of the cover 3 and the lock part 9 disturb each other. As a result, it is impossible to attach the cover 3 to the end parts of the front case 1 and the rear case 2.

However, the lock part 9 is constituted so that the lock part 9 may be deformed in the C direction. Accordingly, the cover 3 is arranged in front of one end part of either the front case 1 or the rear case 2 to which the cover 3 will be attached (refer to FIG. 1B), as a first step. In other words, the cover 3 is arranged so that the side wall 3b of the cover 3 may touch the lock part 9.

Next, in the case that the side wall 3b of the cover 3 is pressed in the C direction, the lock part 9 is deformed in the C direction. Then, a surface of the end part of the rear case 2 and a taper surface 15 of the lock part 9 (refer to FIG. 2B) become parallel each other. At this point of time, the cover 3 can slide easily in the A direction (refer to FIG. 1C).

Then, in the case that the cover 3 is made slide in the A direction, the lock part 9 returns to the original shape by the elastic property at a time when the side wall 3b of the cover 3 passes the lock part 9. As a result, the lock part 9 locks the cover 3. The cover 3 can shift any more neither in the A direction nor the B direction in this state. Moreover, the cover 3 is attached to the end parts of the front case 1 and the rear case 2 (refer to FIG. 1D).

Next, the cover detaching step will be described.

FIG. 2A indicates a case that the front case 1 and the rear case 2 are rotated each other through the end part being made a rotation center in a state that the cover 3 is attached to one end part of either the front case and the rear case. At this point of time, the cover 3 is still rocked to the end part of either the front case 1 or the rear case 2.

The exemplary embodiment will be described in the following with reference to FIG. 2B. The taper surface 15 is arranged on the lock part 9. Accordingly, in the case that the front case 1 makes one rotation, the lock 9, which is mounted on the one end of the front case, gets into the inside of the rear case 2. In the case that an angle of the front case 1 with the rear case 2 becomes identical to an appropriate angle according to the rotation, the taper surface 15 of the lock part 9 and the surface of the end part of the rear case 2 become parallel each other.

The cover 3 becomes unlocked since the lock part 9 shifts to the outside of the cover 3 at this point of time. Consequently, it is possible to make the cover 3 slide in a direction (B direction) reverse to the direction in which the cover is made slide when being attached (refer to FIG. 2C). Then, it is possible to detach the cover 3 from the end part of either the front case 1 or the rear case 2 through making the cover 3 slide in the B direction. Afterward, it is possible to detach the cover 3 from the front case 1 and the rear case 2 (refer to FIG. 2D).

As mentioned above, according to the exemplary embodiment, a screw is unnecessary at a time when the cover 3 is attached. Therefore, it is possible to enhance the assembling property and the disassembling property. Moreover, since a part to put a screw out of view is also unnecessary, it is possible to provide a portable type electronic device with more excellent outside appearance. Furthermore, since a part to put a screw out of view is also unnecessary, it is possible to realize miniaturization and cost reduction.

Furthermore, since the lock part 9 is covered with the cover 3, the lock part 9 does not shift in the direction (direction for unlocking) indicated by the arrow C, even if force is applied from the outside of the cover 3. Accordingly, even if strong shock is applied to the cover 3 when the case falls, the cover 3 does not become unlocked. As mentioned above, according to the exemplary embodiment, it is possible to provide the portable type electronic device which has quite strong mounting strength.

Next, an exemplary embodiment of the present invention will be described in detail with reference to an accompanying drawing.

The exemplary embodiment will be described in the following with reference to FIG. 1A, FIG. 1B, FIG. 1C and FIG. 1D. Case mounting structure of the folding and portable type electronic device, which is equipped with a not-illustrated display unit and a not-illustrated operation unit, is exemplified as the case mounting structure according to the exemplary embodiment. The case mounting structure according to the exemplary embodiment includes the front case 1, the rear case 2 which can be joined with the front case 1, and the cover 3 which can be attached to one end part of the front case 1 and one end part of the rear case 2.

The case mounting structure according to the exemplary embodiment is arranged on one end of the front case 1 to attach the cover 3 to the front case 1 and the rear case 2. At this time, the case mounting structure according to the exemplary embodiment includes the lock part 9 which is deformed through being pressed by the cover 3, and returns to the original shape when the cover 3 is made slide, and locks the cover 3. That is, when the cover 3 is attached to the front case 1 and the rear case 2, the lock part 9 is deformed so as to prevent a movement for unlocking.

While the lock part 9 is arranged on the front case 1 in the exemplary embodiment, it is also possible that the lock part 9 is arranged on the rear case 2.

FIG. 3 is a perspective view of an example of the cover. The exemplary embodiment will be described with reference to FIG. 3 in the following. The cover 3 is formed in a shape of lid. The hook part 4, the hook part 5 and the hook part 6 are arranged on the side wall 3a which is arranged around the cover 3. The hook part 4 is used for attaching the cover 3 to the end parts of the front case 1 and the rear case 2. The hook part 5 is used for attaching the cover 3 to the end part of the front case 1. The hook part 6 is used for attaching the cover 3 to the end part of the rear case 2. These hook parts 4, 5 and 6 can be called an attaching member respectively.

The exemplary embodiment will be described in the following with reference to FIG. 4B. The pawl parts 7 and 8 for attaching the cover 3 to the front cover 1, and the lock part 9 for locking the cover 3 are arranged on one end part of the front case 1. Ditches 7a and 8a are arranged on the pawl parts 7 and 8 respectively. The hook parts 4 and 5 of the cover 3 are fit in the ditch 7a of the pawl part 7 and the ditch 8a of the pawl part 8 respectively. Then, the cover 3 is attached to the front case 1. These pawl parts 7 and 8 can be called an attaching member.

The lock part 9 is constituted so as to be deformed in a direction parallel to the long side of the front case 1 (C direction) or in an opposite direction parallel to the long side of the front case 1 (direction reverse to the C direction) by the elastic property. Moreover, the lock part 9 is formed in a projecting shape with the taper, viewed from the side. Henceforth, a front surface of the lock part 9 is described as the taper surface 15.

In the case that the front case 1 and the rear case 2 are rotated through one end part of the front case 1 and one end part of the rear case 2 being made a rotation center, the angle of the front case 1 with the rear case 2 changes. The taper surface 15 of the lock part 9 is arranged on the front case 1 side. Therefore, the taper surface 15 of the lock part 9 and the surface of one end part of the rear case 2 become parallel each other, if rotated up to an appropriate angle (refer to the right side of FIG. 2B).

Accordingly, the lock part 9, which has locked the cover 3, shifts to the outside of the cover 3 at this point of time. Consequently, locking the cover 3 by the lock part 9 is released.

The exemplary embodiment will be described in the following with reference to FIG. 5B. The pawl parts 10 and 11, which lock the cover 3, are arranged on one end part of the rear case 2. Ditches 10a and 11a are arranged on the pawl parts 10 and 11 respectively. Then, the hook part 4 and the hook part 6 of the cover 3 are fitted into the ditch 10a of the pawl part 13 and the ditch 11a of the pawl part 11 respectively. Consequently, the cover 3 is attached to the rear cover 2. These pawl parts 10 and 11 can be called an attaching member.

Figure 6:
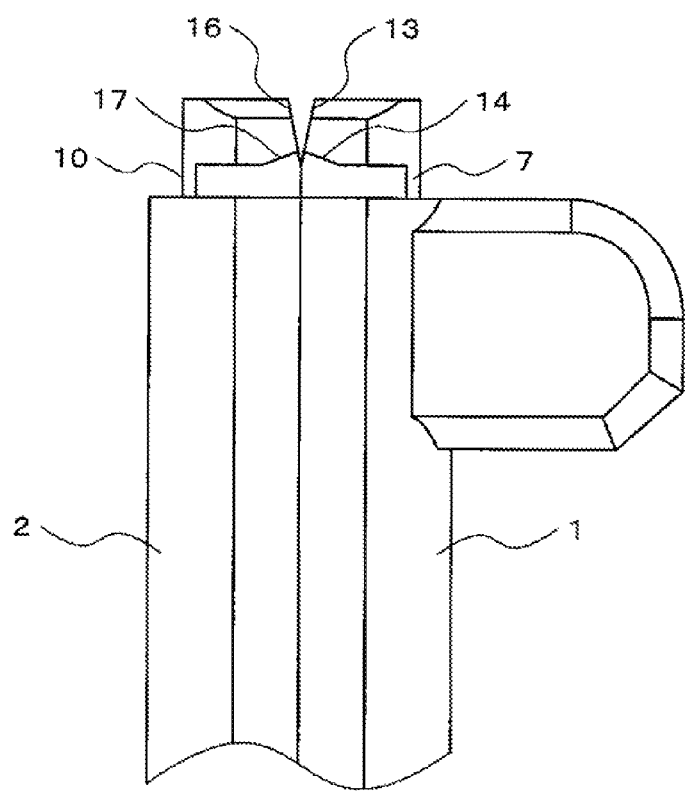
FIG. 6 shows an example of structure of a pawl part which is arranged in the front case and the rear case.

FIG. 6 shows an example of structure of the pawl part arranged on the front case and the rear case.

The exemplary embodiment will be described in the following with reference to FIG. 6. Notches 13 and 14 are arranged on the pawl part 7 of the front case 1, and notches 16 and 17 are arranged on the pawl part 10 of the rear case 2.

The notch 13 arranged on the pawl part 7 and the notch 16 arranged on the pawl part 10 are formed so as to make both of the front case 1 and the rear case 2 not disturb each other up to an appropriate angle, when the front case 1 and the rear case 2 are rotated through an area near the lock part 9 being made a rotation center. Here, the appropriate angle means to be an angle which makes the taper surface 15 of the lock part 9 parallel to the end part surface of the rear case 2.

The notch 14 arranged on the pawl part 7 and the notch 17 arranged on the pawl part 10 are formed so as to make the front case 1 and the rear case 2 not disturb the hook part 4 on the cover 3 up to the appropriate angle, when the front case 1 and the rear case 2 are rotated through an area near to the lock part 9 being made a rotation center.

Next, an operation of the exemplary embodiment will be described.

First, an operation, which is carried out in the case that the cover 3 is attached to the front case 1 and the rear case 2, will be described. FIG. 7 is a flowchart showing an example of the operation which is carried out in the case that the cover 3 is attached to the front case 1 and the rear case 2. Hereinafter, the exemplary embodiment will be described with reference to FIG. 1 and FIG. 7.

Firstly, the front case 1 and the rear case 2 are joined together (the case joining step; refer to FIG. 1A and step S1 in FIG. 7). Next, the hook part 4 of the cover 3 is arranged so as to be in front of the pawl part 7 of the front case 1 and the pawl part 10 of the rear case 2 to which the hook part 4 will be attached. Furthermore, the hook part 5 of the cover 3 is arranged so as to be in front of the pawl part 8 of the front case 1 to which the hook part 5 will be attached. Moreover, the hook part 6 of the cover 3 is arranged so as to be in front of the pawl part 11 of the rear case 2 to which the hook part 6 will be attached (refer to FIG. 1B and step S2 in FIG. 7, the arranging step).

At this time, since the lock part 9 is projected, the lock part 9 disturbs the side wall 3b of the cover 3. Consequently, it is impossible to make the cover 3 slide in the direction indicated by the arrow A. Meanwhile, the lock part 9 is constituted so as to be able to be deformed in the direction indicated by the arrow C.

Then, the side wall 3b, which is corresponding to the end part of the cover 3, is pressed against the lock part 9, which is mounted on one end of the front case 1, in the direction indicated by the arrow C and simultaneously, the cover 3 is made slide in the direction indicated by the arrow A. In the case that the cover 3 is made slide so that the end part 3b of the cover 3 may pass the lock part 9, the lock part 9 comes off the end part 3b of the cover 3 and returns to the original position by the elastic property. As a result, the lock part 9 locks the cover 3 (the locking step; refer to FIG. 1C and step S3 in FIG. 7).

By the lock, the cover 3 can shift any more neither in the direction indicated by the arrow B nor in the direction indicated by the arrow A. At the same time, the pawl parts 7, 8, 10 and 11 which are arranged on the front case 1 and the rear case 2, and the hook parts 4 to 6 which are arranged on the cover 3 are fit together respectively, and consequently, the cover 3 is fixed (refer to FIG. 1D and step S4 in FIG. 7, the pawl fitting step).

As long as the lock part is not released, the cover 3 cannot be unlocked any more. In order to release the lock part 9, it is necessary to draw the lock part 9 in the direction indicated by the arrow C. However, since the lock part 9 is covered with the cover 3, the lock part 9 dose not shift in the direction indicated by the arrow C (direction for unlocking), even if force is applied from the outside of the cover 3.

Figure 8:
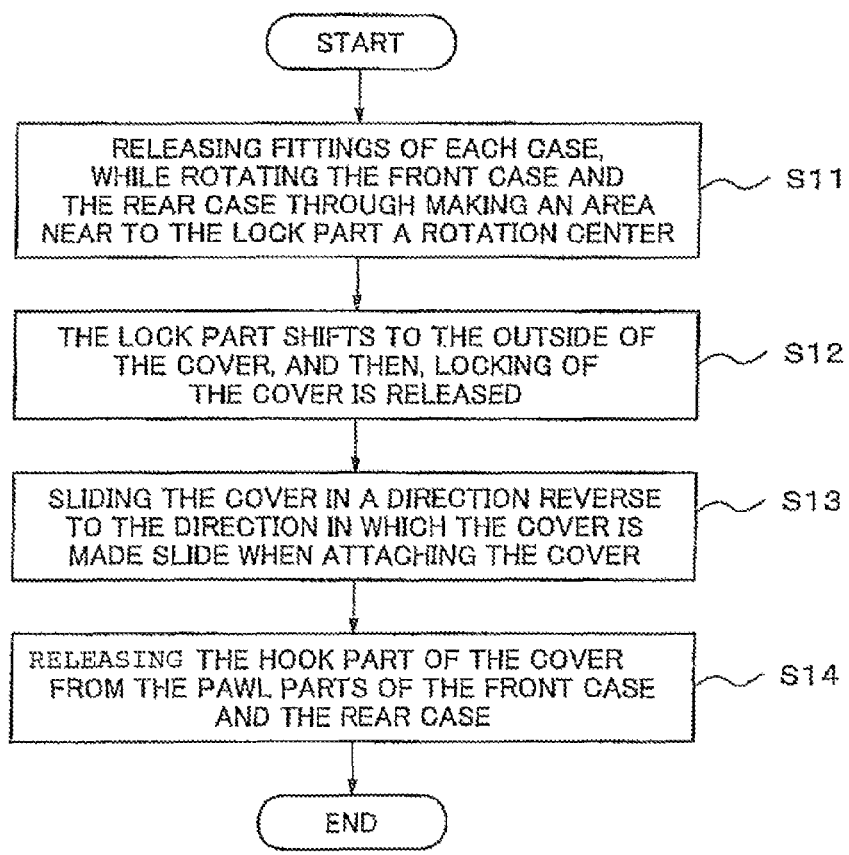
FIG. 8 is a flowchart showing an example of an operation which is carried out in the case that the cover is detached from the front case and the rear case.

Next, an operation, which is carried out when detaching the cover 3 from the front case 1 and the rear case 2, will be described. FIG. 8 is a flowchart showing an example of the operation which is carried out when detaching the cover 3 from the front case 1 and the rear case 2. The operation will be described in the following with reference to FIG. 2 and FIG. 8.

First, fitting of the front case 1 and fitting of the rear case 2 are released from the end part side opposite to the cover 3. That is, the front case 1 and the rear case 2 are rotated through an area near to the lock part 9 being made a rotation center and simultaneously, fitting of each case is released (an each case fitting releasing step; refer to FIG. 2A and step S11 in FIG. 8).

The notches 13 and 14 are arranged on the front case 1. The notches 16 and 17 are arranged on the rear case 2. By these notches 13, 14, 16 and 17, when the front case 1 and the rear case 2 are rotated through an area near to the lock part 9 being made a rotation center, there is nothing to disturb the rotation up to the above-mentioned appropriate angle. For this reason, it is possible to rotate the front case 1 and the rear case 2 smoothly.

In the case of rotating the front case 1 through making a near area to the lock part 9 a rotation center and lifting the front case 1, the lock part 9 arranged on the front case 1 shifts to the outside of the cover 3. As a result, the end surface of the rear case 2, and the taper surface 15 arranged on the lock part 9 become parallel each other, and then, locking the cover 3 is released (a releasing step; refer to FIG. 2B and Step S12 in FIG. 8).

Continuously, the cover 3 is made slide in the direction indicated by the arrow B (a sliding step; refer to FIG. 2C and Step S13 in FIG. 8).

Then, the pawl parts 7, 8, 10 and 11 arranged on the front case 1 and the rear case 2 come off the hook part 4 to 6 arranged on the cover 3. As a result, the cover 3 is detached from the front case 1 and the rear case 2.

Then, the joining of the front case 1 and the rear case 2 is released (a joining releasing step; refer to FIG. 2D and step S14 in FIG. 8).

As it has been described above, since a screw is unnecessary at a time when the cover 3 is attached to the front case 1 and the rear case 2, it is possible to enhance the assembling property and the disassembling property according to the exemplary embodiment. Moreover, since it is unnecessary to use a part to put a screw out of view, it is possible to provide the portable type electronic device with more excellent outside appearance. Furthermore, since it is unnecessary to use a part to put a screw out of view, it is possible to contribute for miniaturization and cost reduction.

Moreover, strong mounting strength can be acquired with no use of fixation by a screw. That is, since the lock part 9 is covered with the cover 3, the lock part 9 does not shift in the direction indicated by the arrow C (direction for unlocking), even if force is applied from the outside of the cover 3. Furthermore, since the cover 3 is in a shape of box, it is difficult that the cover 3 is bent in the direction for unlocking. Accordingly, since it is difficult for the side wall around the cover 3 to open, the lock part and the pawl part do not come off. Thus, it is possible to have quite strong mounting strength.

While the present invention has been described with reference to the exemplary embodiment, the present invention is not limited to the above mentioned embodiment. It is possible to add various modifications, which a person skilled in the art can understand and which are within the scope of the present invention, to the structure and the detail of the present invention.

INDUSTRIAL APPLICABILITY

The folding type portable electronic device equipped with the display unit and the operating unit has been described as an example according to the present invention. However, the present invention is not limited to the folding type portable electronic device, and can be applied to a cover of an end part of a case of other equipment.

The invention claimed is:

1. A case mounting structure comprising:
a cover which can be attached to a case;
a lock part which is arranged on the case and locks the cover,
wherein the lock part is deformed so as to prevent a movement for releasing lock when the cover is attached to the case,
wherein the case includes a first member and a second member, and a lock state of the lock part is released when the first member and the second member are rotated through one end part of the first member and one end part of the second member being made a rotation center; and
fitting members which are arranged on an end part of the first member, an end part of the second member, and the cover respectively in order to fit both the end parts and the cover a notch part which is arranged on the fitting member which is arranged on an end part of either the first member or the second member,
wherein the notch part make both of the fitting members not disturb each other up to an appropriate angle when the first member and the second member are rotated though one end part of the first member and one end part of the second member being made a rotation center.

2. The case mounting structure according to claim 1 further comprising a taper surface which is arranged on the lock part,
wherein the taper surface keeps an end surface of an opposing member and an end surface of the lock part parallel each other when the first member and the second member are rotated through one end part of the first member and one end part of the second member being made a rotation center.

3. The case mounting structure according to claim 1,
wherein the first member is a front case of the case, and
wherein the second member is a rear case of the case.

4. The case mounting structure according to claim 1, wherein the cover attached to the case by sliding an end part of the cover through being pressed against the lock part until the end part of the cover passes the lock part.

5. A case which includes the case mounting structure according to claim 1.

6. A case mounting method comprising:
joining a first member and a second member of a case;
arranging a hook part of a cover, which can be attached to the first member and the second member, in front of pawl parts of the first member and the second member to which the hook of the cover can be attached;
locking the cover to a lock part, which is arranged on the first member, returned from a deforming position to an original position by making an end part of the cover slide through pressing the end part of the cover against the lock part; and
fitting the hook part of the cover and the pawl parts of the first member and the second member.

7. The case mounting method according to claim 6 further comprising:
rotating the first member and the second member through making an area near to the lock part a rotation center, and to detach each of the first member and the second member;
releasing lock of the cover by shifting the lock part to the outside of the cover;
sliding the cover in a direction reverse to a direction in which the cover is made slide when the cover is attached; and
releasing fitting of a hook part of the cover with pawl parts of the first member and the second member.

8. The case mounting method according to claim 6,
wherein the first member is a front case of the case, and
wherein the second member is a rear case of the case.

* * * * *